(12) United States Patent
Morrell

(10) Patent No.: US 8,875,586 B2
(45) Date of Patent: Nov. 4, 2014

(54) GAS FLOW METER WITH HORIZONTAL PISTON MOVEMENT

(75) Inventor: Edward Albert Morrell, Randolph, NJ (US)

(73) Assignee: Mesa Laboratories, Inc., Lakewood, CO (US)

( * ) Notice: Subject to any disclaimer, the term of this patent is extended or adjusted under 35 U.S.C. 154(b) by 186 days.

(21) Appl. No.: 13/530,968

(22) Filed: Jun. 22, 2012

(65) Prior Publication Data

US 2013/0008261 A1 Jan. 10, 2013

Related U.S. Application Data

(60) Provisional application No. 61/499,880, filed on Jun. 22, 2011, provisional application No. 61/501,856, filed on Jun. 28, 2011.

(51) Int. Cl.
*G01F 1/56* (2006.01)
*G01F 7/00* (2006.01)
*G01F 3/18* (2006.01)

(52) U.S. Cl.
CPC ... *G01F 3/18* (2013.01); *G01F 7/00* (2013.01)
USPC .................................................. 73/861.08

(58) Field of Classification Search
USPC .......................................................... 73/239
See application file for complete search history.

(56) References Cited

U.S. PATENT DOCUMENTS

| | | | | |
|---|---|---|---|---|
| 3,640,434 A | * | 2/1972 | Walker | 222/144.5 |
| 4,096,747 A | * | 6/1978 | Gilson | 73/251 |
| 4,584,977 A | * | 4/1986 | Lenk et al. | 123/196 S |
| 5,052,211 A | * | 10/1991 | Cohrs et al. | 73/1.23 |
| 5,277,074 A | * | 1/1994 | Poole et al. | 73/864.62 |
| 5,435,187 A | * | 7/1995 | Ewy et al. | 73/856 |
| 5,445,035 A | * | 8/1995 | Delajoud | 73/861.52 |
| 5,456,107 A | | 10/1995 | Padden et al. | |
| 6,752,026 B1 | * | 6/2004 | Hyde | 73/861.15 |
| 7,395,708 B2 | * | 7/2008 | Kirchner et al. | 73/239 |
| 8,264,361 B2 | * | 9/2012 | Struyk | 340/603 |

OTHER PUBLICATIONS

EC Instruments, Basic Working Principle, publication date unknown, seen online in approximately Nov. 2010.
EC Instruments, Preliminary data sheet for Reciflow flow meter, publication date unknown, seen online on or about Nov. 26, 2010.

* cited by examiner

*Primary Examiner* — Jewel V Thompson
(74) *Attorney, Agent, or Firm* — Ostrolenk Faber LLP

(57) ABSTRACT

A method and a gas flow meter for measuring gas flow. A cylinder is supported in the flow meter with a horizontal orientation. A piston is disposed movably within the cylinder, the piston having a surface which forms a clearance seal with a surface of the cylinder. The piston may have a low-friction coating such as diamond-like carbon. A gas flow to be measured is received at a gas inlet, and directed to the cylinder so as to move the piston within the cylinder. The gas flow is directed by valves and conduits alternately to the two ends of the cylinder, for measuring the gas flow in both directions of the cylinder. From the detected movement of said piston electrical signals representative of the gas flow are generated.

24 Claims, 4 Drawing Sheets

GAS FLOW METER WITH HORIZONTAL PISTON MOVEMENT

CROSS-REFERENCE TO RELATED APPLICATION

This application claims priority to U.S. Provisional Application Ser. No. 61/499,880 filed on Jun. 22, 2011, and Ser. No. 61/501,856 field on Jun. 28, 2011, both incorporated by reference in their entireties.

BACKGROUND OF THE INVENTION

The present invention relates to a high accuracy positive displacement gas flow meter with horizontal piston movement. The flow meter may advantageously have a low mass piston, constructed of a rigid material such as glass or graphite. Advantageously, a low friction film outer coating of wear resistant material such as diamond-like carbon (DLC) may be formed on the piston.

Positive displacement piston flow meter technology is well established. A piston is fitted precisely into a cylinder with a clearance in the range of up to about 10 microns. Flow introduced into the cylinder displaces the piston. The time required to displace the piston a known distance is used to measure the flow rate. See for example U.S. Pat. No. 5,440,925, incorporated by reference. Current flow meters of this type have pistons constructed of various materials such as glass or graphite. The piston is fitted into a cylinder, commonly made of glass, which is typically oriented vertically to minimize piston wear.

However, in these positive displacement piston flow meters, measurement errors can be introduced from the acceleration of the piston compressing the fluid under measurement as a measurement is initiated; friction between the cylinder and piston causing pressure variations as the flow is being measured; and clearance between the piston and cylinder resulting in a small leakage of fluid through this clearance. This leakage can be measured and added back into the flow measurement. However, minimizing the leakage improves flow measurement accuracy, especially when the fluids to be measured may have different physical properties.

SUMMARY OF THE INVENTION

Some or all of these errors may be reduced or avoided by a cylinder having a low mass piston, optionally but advantageously with a low-friction coating, arranged in a horizontal cylinder. Flow is introduced into the cylinder under the control of valves. The piston is displaced a known distance in the cylinder to make a measurement, and then the valves reverse the flow to displace the piston in the opposite direction to make the next measurement.

As used herein, the term "cylinder" includes not merely a cylinder with a circular cross-section, but also any other regular geometric solid shape adapted to receive a correspondingly-shaped piston for flow measurement according to the principles described herein.

A gas flow meter according to these principles may comprise the following: a support portion for supporting said flow meter on an external structure; a cylinder supported in said flow meter so as to be held in a horizontal orientation when said flow meter is supported on said external structure; a piston movable within said cylinder, the piston having a surface which forms a clearance seal with a surface of said cylinder; a gas inlet for receiving a gas flow to be measured, and valving for directing said flow to said cylinder so as to move said piston within said cylinder; and a movement detector for detecting movement of said piston and generating therefrom electrical signals representative of said gas flow to be measured. The piston may have a low-friction coating. The support portion may be a base of said flow meter, configured for resting on the external surface, and said cylinder may be supported substantially parallel to said base. There may also be a leveling device at the base for adjusting the horizontal orientation of the cylinder. The valving may comprise first valves for directing the gas flow to a first end of said cylinder for moving said piston in a first direction, and second valves for directing said gas flow to a second end of said cylinder for moving said piston in a second direction.

Also advantageous is a control unit which controls said valves to alternately direct said gas flow to said first end and to said second end and to process said electrical signals and thereby output said measured gas flow in said first and second directions.

Also useful according to these principles is a method of measuring gas flow utilizing the techniques and equipment described herein.

The piston is preferably fabricated from a rigid material to maintain dimensional stability with mass minimized as much as practical by shaping the material. Borosilicate glass is preferred, although graphite and other materials can also be used. The piston can also have a low friction coating applied such as diamond-like carbon, particularly if the piston is made of glass. Borosilicate glass is a preferred material for the cylinder.

The measurement errors listed above are reduced by several aspects of the disclosed device. First, the low mass piston accelerates faster, reducing compression of the fluid under measure. Second, the lower mass of the piston, possibly aided by the low friction coating, reduces friction between the piston and cylinder. And third, the leakage through the piston and cylinder clearance is reduced. This leakage is proportional to the fluid pressure required to displace the piston. By reducing the piston mass and friction and the effect of gravity, the pressure required to displace the piston is reduced. This reduces the leakage between the piston and cylinder, enhancing measurement and accuracy.

With the horizontal orientation of the piston, the piston can be made lighter than in the known flow meters. In prior vertical cylinders, the piston was required to have substantial mass in order to descend rapidly after being raised by the gas flow. Also less energy is required to move the piston horizontally. More data can be acquired, faster, than with the prior flow meters.

Thus, the flow meter can use a piston with a combination of low mass and low friction, which may require less than 0.002 psi of gas pressure to be displaced. With almost no pressure needed to displace the piston, the gas leakage around the piston becomes insignificant. The low mass piston thus has faster response time, and produces minimal pressure changes in the gas stream during the measurement cycle. With the faster response time and taking flow measurements in both directions as the piston translates between the measurement detectors, gas flow readings are obtained significantly faster than with previous flow meters.

When a gas flow measurement is initiated two normally closed valves for the selected tube open and four flow control valves operate directing the gas flow. The piston oscillates between two piston measurement detectors and the time interval required for the piston to sweep the calibrated tube volume provides the volumetric flow rate. A temperature transducer located at the gas stream entrance to the tube measures gas temperature. A precision pressure sensor measures gas pressure in the measurement tube. From the gas temperature, gas pressure and a compressibility factor the volumetric gas flow rate is converted to a standardized gas flow rate. Compressibility factor is a small correction factor applied during conversion of volumetric flow to standardized flow, as required for best accuracy when measuring reactive gases. When measuring non-reactive or inert gases the compressibility factor is negligible and can be ignored. To apply a compressibility factor correction the user selects the gas species being measured from a table of gases in the memory. The compressibility factors may be previously obtained from the NIST database of gas properties REFPROP and stored in the memory.

According to one version, the flow meter reads instantaneous gas flow rate, by pressure drop or with a thermal element, allowing the instrument to automatically select the correct flow tube, referred to as auto-ranging. Initial auto-ranging can be performed with an instantaneous gas flow transducer, either differential pressure or mass flow, which monitors the gas flow into the instrument and gives data to select the correct flow tube.

In another version, a start-up sequence begins with the highest flow tube, and on the basis of the first reading, a determination is made of the correct flow tube to be selected. Subsequent auto-ranging will occur in response to changes in the flow meter readings.

Each tube has four optically based piston detectors. Two detectors are used for measuring the piston timing as the piston traverses the calibrated tube volume (referred to as left-measure, right-measure). A second set of optical detectors is used to detect the piston at the end of the tube (referred to as left-detect, right-detect). Using known technology, the measurement sensors all detect the same piston edge with the optical detection path being tilted at a nominal 2 degree offset from perpendicular.

When a single or initial measurement is started, if the piston is not detected by the left-detect sensor, the valves are sequenced to displace the piston to the left until the piston is detected. After piston detection a normal measurement cycle is started. The first left to right reading may be discarded to allow for flow stability. After measurement is started the piston reversal occurs at a set time delay after the piston reaches the end measurement sensor. The time delay interval is set for the time needed to reverse the piston direction and allow the piston movement to stabilize. The left-detect and right-detect optical detectors activate a piston reversal if the time delay interval is not reached, and also to prevent piston damage in cases of a measurement sensor failure.

Other features and advantages will become apparent from the following description of embodiments, which refers to the accompanying drawings.

DETAILED DESCRIPTION OF EMBODIMENTS OF THE INVENTION

Figure 1:
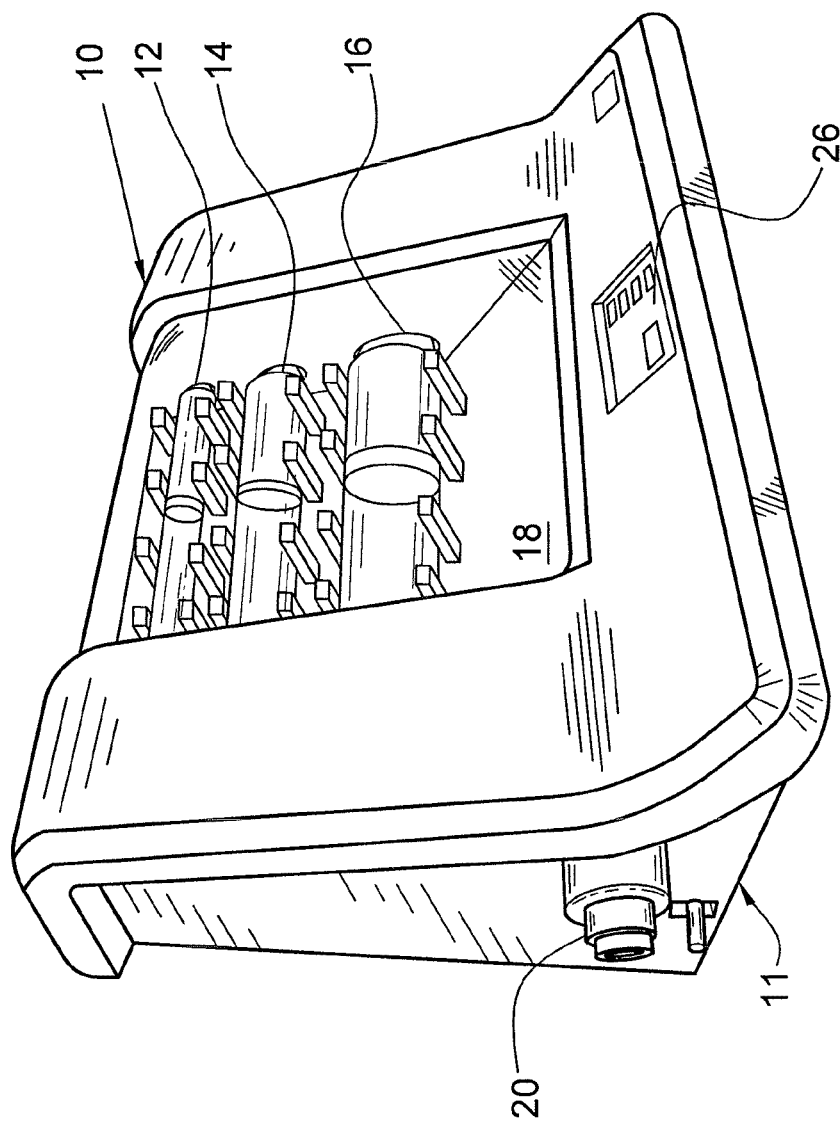
FIG. 1 is a perspective view of a flow meter.

FIG. 1 is a perspective view of a flow meter 10, including three horizontal gas flow tubes 12, 14, 16 behind a viewing window 18, a pair of gas inlet/outlet ports 20, 22 (see FIG. 2), and a user interface 26 comprising an LED touch screen which accepts user inputs and reads out the flow readings.

Figure 2:
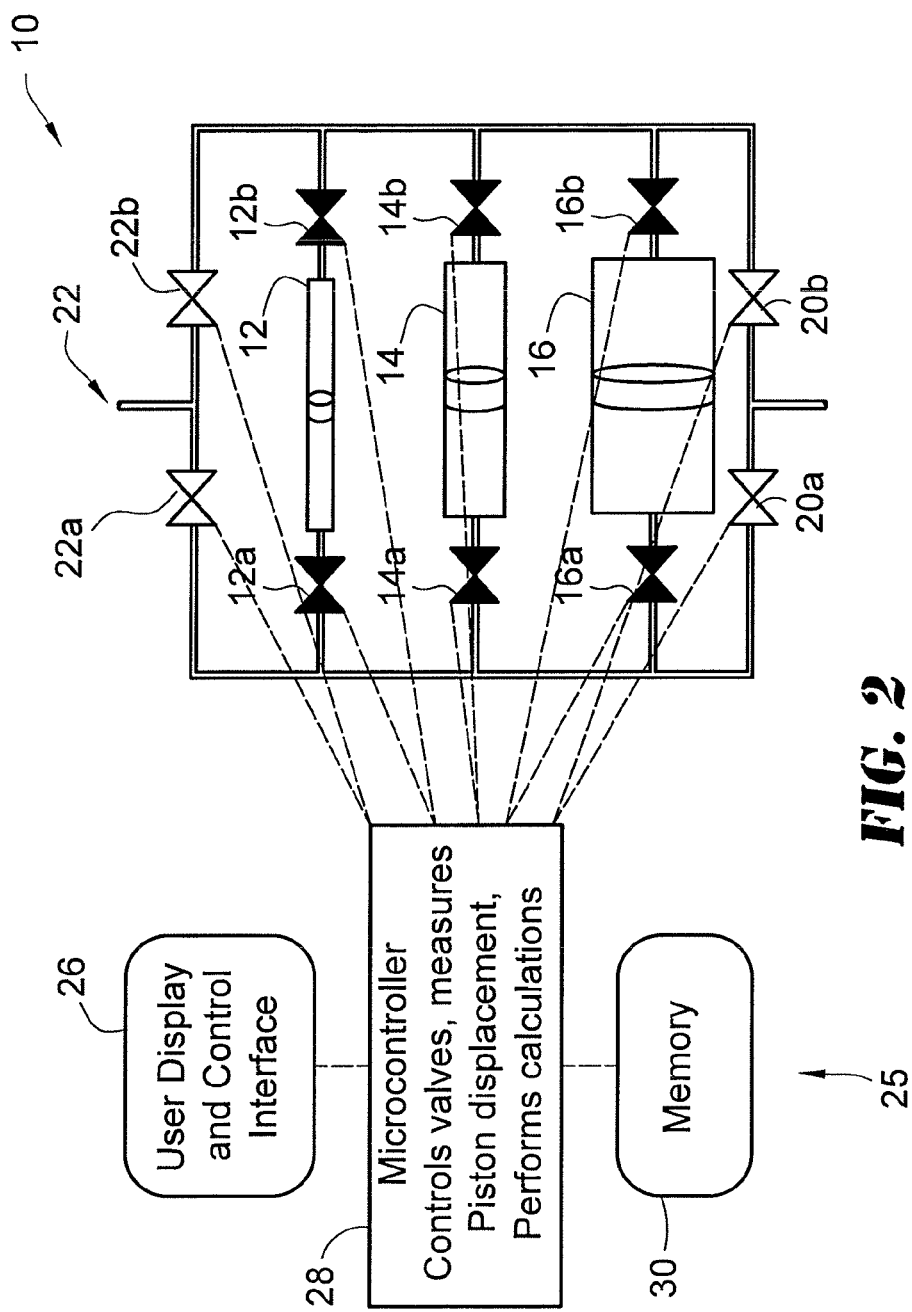
FIG. 2 is a schematic block diagram of the flow meter.

The three gas flow tubes 12, 14 and 16 and related hardware are shown schematically in FIG. 2. A control part 25 includes the user interface 26, and a microcontroller 28 with a memory 30. The tube 12 is for low flow, for example 5 to 500 ccm. The tube 14 is for medium flow, for example 500-5000 ccm. The tube 16 is for high flow, for example 5000-50000 ccm.

In another version, the largest tube and piston (~51 mm diameter) measures flow rates from 50,000 ccm to 3,500 ccm. The medium tube and piston (~24 mm diameter) measures flow rates from 5,000 ccm to 350 ccm, and the smallest tube and piston (~10 mm diameter) measures flow rates from 500 ccm to 5 ccm. The overlapping of the flow ratings between the tubes in this version allows for cross checking flow measurements with two tubes to verify instrument accuracy.

The flow meter 10 has a base 11 for resting on a work surface. The flow tubes are held in the flow meter so as to be horizontal when the flow meter is resting on the work surface. A suitable leveling device, such as an adjustable foot or feet (not shown), is advantageously provided at the base.

Normally-closed valves 12a, 12b, 14a, 14b, 16a, 16b can be selectively opened by the microcontroller 28 to direct gas flow through conduits to the corresponding tube 12, 14 or 16. This selection is made in response to user input or to a suitable sensor (not shown), which detects the quantity of flow to be measured and gives this information to the microcontroller 28.

Flow direction is controlled by normally-open valves 20a, 20b, 22a and 22b, connected by conduits to the valves 12a-16b. Gas flow from left to right is provided by the microcontroller 28 closing inlet valve 20b and outlet valve 22a. Gas flow from right to left is provided by closing inlet valve 20a and outlet valve 22b. These settings are alternated in order to provide gas flow measurements in both directions. This is in contrast to the known flow meters, which measure gas flow only in one direction, during the upward movement of a piston. Gas flows from the inlet port 20 to the right side of the flow meter 10 via fittings 70, 72 connected by a tube, not shown. Gas flows from the left side of the flow meter 10 to the outlet port 22 via fittings 74, 76 connected by a tube, not shown.

The normally-open and normally-closed valves can be replaced by other types of valves, with simple changes in the measuring process.

Figure 3:
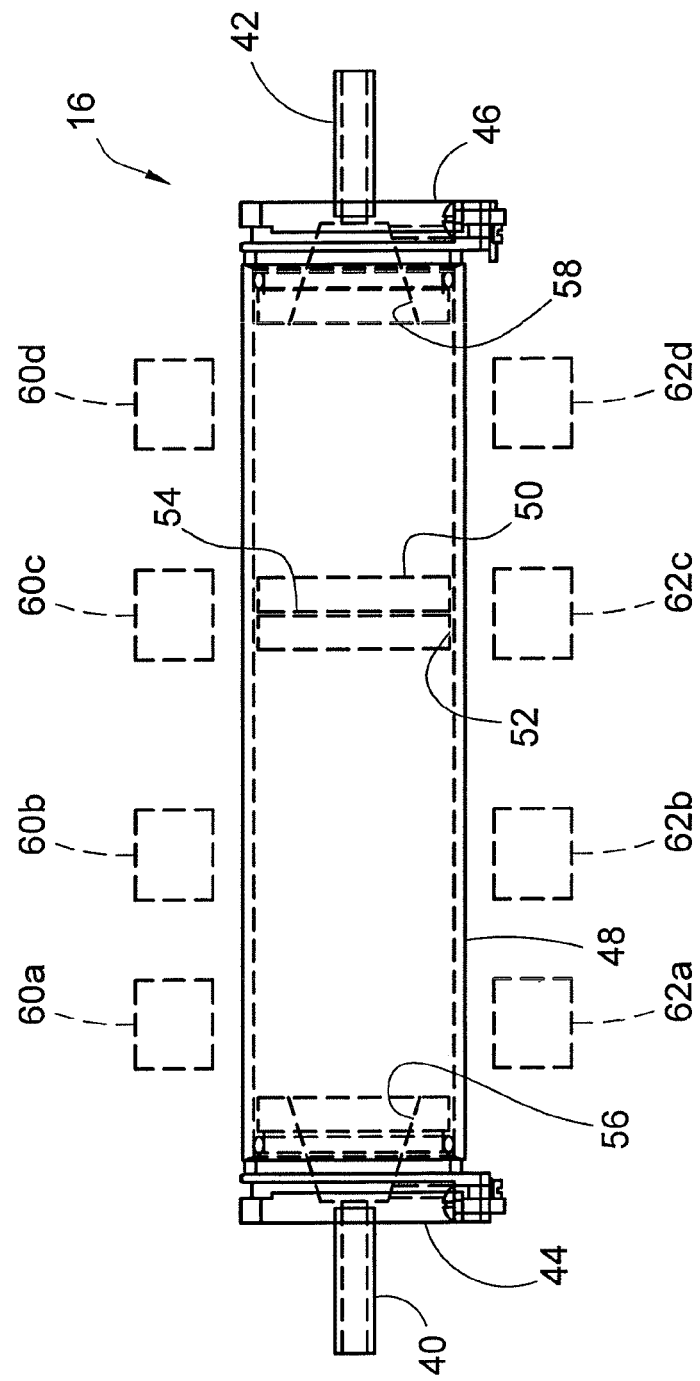
FIG. 3 is a side view, partly in phantom, showing a combination of a cylinder and a piston.

The gas flow cell 16 is shown in detail in FIG. 3, including a first inlet/outlet port 40 and a second inlet/outlet 42 mounted on respective end caps 44, 46. The end caps support respective ends of the borosilicate glass cylinder 48. The piston 50 slidably rests inside the cylinder 48 for movement to the right and left in response to gas pressure coming alternately from the ports 40 and 42, respectively. The piston 50 may be made of borosilicate glass or graphite, for example. As mentioned above, the piston 50 may have a low-friction coating, such as DLC, not shown in the figures.

As seen in FIG. 3, the piston 50 is formed as a cylinder 52 and a central web 54. The piston may be machined from a solid piece of graphite. This construction can be extremely low in mass, which is made possible by the horizontal orientation. Prior vertical flow meters needed a heavier piston, as mentioned above.

In another version, the piston may be formed of two separate pieces of glass, joined together, and advantageously with a low-friction coating. The low-friction coating would, however, be unnecessary with a graphite piston because of the self-lubricating properties of graphite on glass.

As also seen, gas enters the cylinder through passages 56, 58 formed in the end caps 44, 46.

Optical sensors 60*a, b, c, d* and 62*a, b, c* and *d* for sensing the piston position are shown schematically in FIG. 3. Advantageously the central sensor pairs 60*b*, 62*b*, and 60*c* and 62*c* may be used for sensing the piston timing, which the outer sensor pairs 60*a*, 62*a* and 60*d*, 62*d* may be used as safety sensors to detect abnormal movements of the piston toward the ends of the tube.

Control of the flow meter is through a touch panel 18 on the front panel or through commands sent through a data port (not shown). The flow meter will auto-select the correct tube and display the flow rate.

Figure 4:
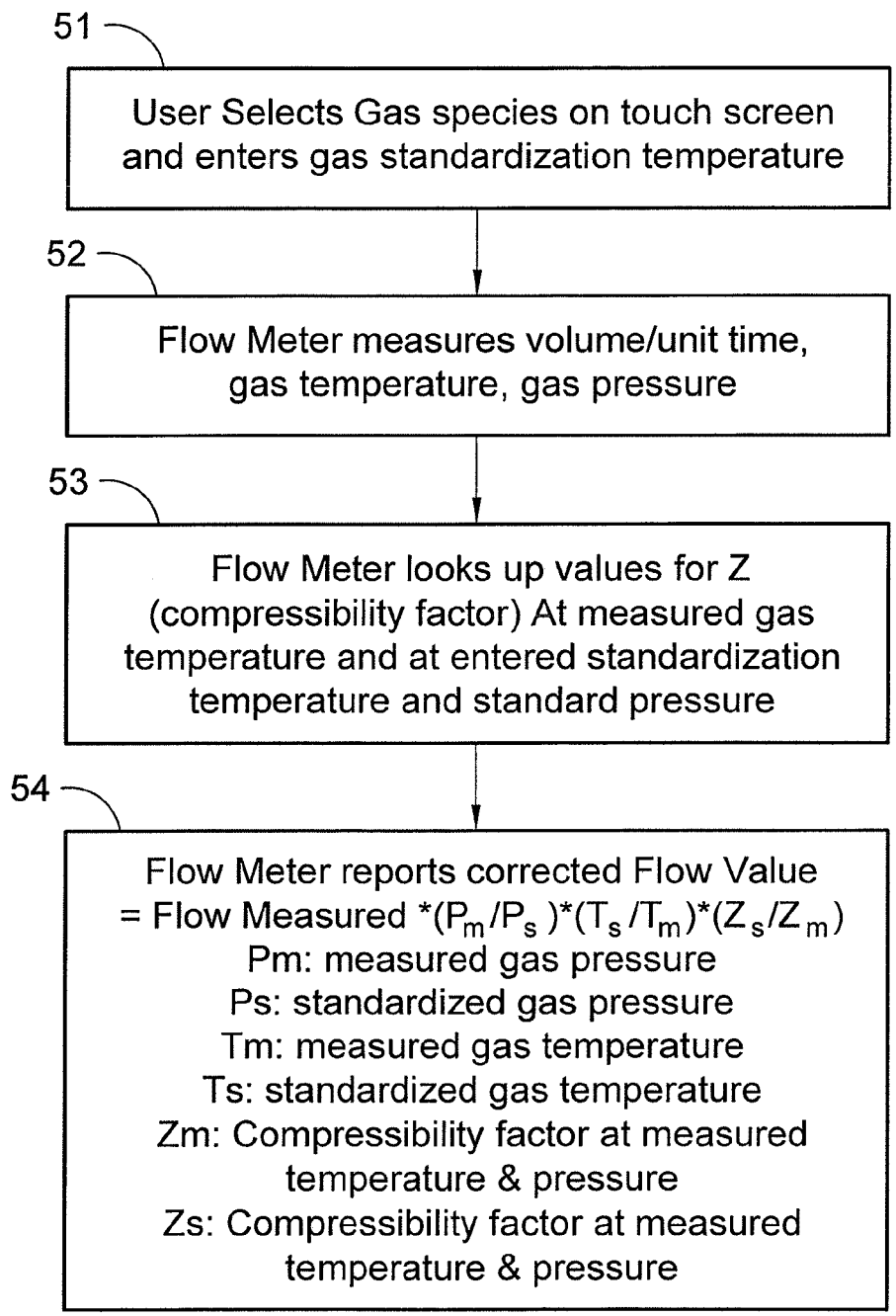
FIG. 4 is a flow diagram showing steps in the operation of the flow meter.

In operation, referring to FIG. 4, in a step S1, the user selects the gas species on touch screen and enters gas standardization temperature.

In a step S2, the microcontroller measures volume/unit time, gas temperature, gas pressure via temperature and pressure sensors 33, 34 (FIG. 5). In this embodiment, there is one temperature sensor for each of the tubes 12, 14 and 16. FIG. 5 shows a representative temperature sensor 32 adjacent to the tube 16. The tube mount has been removed to make the temperature sensor 32 visible. Also indicated in FIG. 5 is the location of the pressure sensor 34.

In a step S3, the microcontroller looks up values for Z (compressibility factor) at measured gas temperature and pressure and at entered standardization temperature and standard pressure.

In a step S4, the microcontroller reports corrected flow value=flow measured*$(P_m/P_s)*(T_s/T_m)*(Z_s/Z_m)$, Pm: measured gas pressure, Ps: standardized gas pressure, Tm: measured gas temperature, Ts: standardized gas temperature, Zm: compressibility factor at measured temperature and pressure, Zs: compressibility factor at standardized temperature pressure.

Although the present invention has been described in relation to particular embodiments thereof, many other variations and modifications and other uses will become apparent to those skilled in the art. Therefore, the present invention is not limited by the specific disclosure herein.

What is claimed is:

1. A gas flow meter comprising:
   a support portion for supporting said flow meter on an external structure;
   a cylinder supported in said flow meter so as to be held in a horizontal orientation when said flow meter is supported on said external structure;
   a piston movable within said cylinder in first and second directions which are opposite to each other, along the length of said cylinder, the piston having a surface which forms a clearance seal with a surface of said cylinder;
   a gas inlet for receiving a gas flow to be measured, and valving for directing said gas flow to said cylinder so as to move said piston within said cylinder in both said directions by pressure of said gas flow; and
   a movement detector for detecting movement of said piston in both said directions and generating therefrom electrical signals representative of said gas flow to be measured in both said directions.

2. A gas flow meter according to claim 1, wherein said support portion is a base of said flow meter, configured for resting on the external structure, and said cylinder is supported substantially parallel to said base.

3. A gas flow meter comprising:
   a support portion for supporting said flow meter on an external structure;
   a cylinder supported in said flow meter so as to be held in a horizontal orientation when said flow meter is supported on said external structure;
   a piston movable within said cylinder, the piston having a surface which forms a clearance seal with a surface of said cylinder;
   a gas inlet for receiving a gas flow to be measured, and valving for directing said gas flow to said cylinder so as to move said piston within said cylinder;
   a movement detector for detecting movement of said piston and generating therefrom electrical signals representative of said gas flow to be measured; and
   wherein said support portion is a base of said flow meter, and further comprising a leveling device at the base for adjusting the horizontal orientation of the cylinder.

4. A gas flow meter comprising:
   a support portion for supporting said flow meter on an external structure;
   a cylinder supported in said flow meter so as to be held in a horizontal orientation when said flow meter is supported on said external structure;
   a piston movable within said cylinder, the piston having a surface which forms a clearance seal with a surface of said cylinder;
   a gas inlet for receiving a gas flow to be measured, and valving for directing said gas flow to said cylinder so as to move said piston within said cylinder;
   a movement detector for detecting movement of said piston and generating therefrom electrical signals representative of said gas flow to be measured; and
   further comprising a leveling device at the support portion for adjusting the horizontal orientation of the cylinder.

5. A gas flow meter according to claim 1, wherein said valving comprises first valves for directing the gas flow to a first end of said cylinder for moving said piston in said first direction, and second valves for directing said gas flow to a second end of said cylinder for moving said piston in said second direction.

6. A gas flow meter according to claim 5, furthering comprising a control unit which controls said valves to alternately direct said gas flow to said first end and to said second end and to process said electrical signals and thereby output said measured gas flow in said first and second directions.

7. A gas flow meter according to claim 1, further comprising a low-friction coating on said piston.

8. A gas flow meter according to claim 7, wherein said low-friction coating comprises diamond-like carbon.

9. A method of measuring gas flow, comprising the steps of:
   supporting said flow meter on an external structure;
   supporting a cylinder in said flow meter in a horizontal orientation;
   disposing a piston movably within said cylinder in first and second directions which are opposite to each other, along the length of said cylinder, the piston having a surface which forms a clearance seal with a surface of said cylinder;
   receiving a gas flow to be measured at a gas inlet, and directing said gas flow to said cylinder so as to move said piston within said cylinder in both said directions by pressure of said gas flow; and
   detecting movement of said piston in both said directions and generating therefrom electrical signals representative of said gas flow to be measured in both said directions.

10. A method according to claim 9, wherein said flow meter is supported on a base of said flow meter, configured for resting on a horizontal surface, and said cylinder is supported substantially parallel to said base.

11. A method of measuring gas flow, comprising the steps of:
supporting said flow meter on an external structure;
supporting a cylinder in said flow meter in a horizontal orientation;
disposing a piston movably within said cylinder, the piston having a surface which forms a clearance seal with a surface of said cylinder;
receiving a gas flow to be measured at a gas inlet, and directing said gas flow to said cylinder so as to move said piston within said cylinder;
detecting movement of said piston and generating therefrom electrical signals representative of said gas flow to be measured; and
further comprising leveling a support portion of the flow meter for adjusting the horizontal orientation of the cylinder.

12. A method of measuring gas flow, comprising the steps of:
supporting said flow meter on an external structure;
supporting a cylinder in said flow meter in a horizontal orientation;
disposing a piston movably within said cylinder, the piston having a surface which forms a clearance seal with a surface of said cylinder;
receiving a gas flow to be measured at a gas inlet, and directing said gas flow to said cylinder so as to move said piston within said cylinder;
detecting movement of said piston and generating therefrom electrical signals representative of said gas flow to be measured; and
wherein said flow meter is supported on a base of said flow meter, and further comprising the step of adjusting the horizontal orientation of the cylinder.

13. A method according to claim 9, wherein said directing step comprises the steps of first directing the gas flow to a first end of said cylinder for moving said piston in said first direction, and then directing the gas flow to a second end of said cylinder for moving said piston in said second direction.

14. A method according to claim 13, further comprising the steps of alternately directing said gas flow to said first end and to said second end and processing said electrical signals and thereby outputting said measured gas flow in said first and second directions.

15. A method according to claim 9, further comprising the step of providing a low-friction coating on said piston.

16. A method according to claim 15, wherein said low-friction coating comprises diamond-like carbon.

17. A gas flow meter comprising:
a support portion for supporting said flow meter on an external structure;
a plurality of cylinders supported in said flow meter so as to be held in a horizontal orientation when said flow meter is supported on said external structure, said cylinders having different sizes for measuring different respective gas flow ranges;
each cylinder having a piston movable therein, the piston having a surface which forms a clearance seal with a surface of the cylinder;
a gas inlet for receiving a gas flow to be measured, and valving for directing said flow to a selected one of said cylinders so as to move said piston within the selected said cylinder; and
a movement detector for detecting movement of said piston and generating therefrom electrical signals representative of said gas flow to be measured.

18. A method according to claim 17, further comprising a control unit which automatically selects one of said cylinders in response to a gas flow to be measured and controls said valving to direct said gas flow to the selected said cylinder.

19. A method according to claim 18, wherein said control unit initially directs the gas to the largest cylinder and determines whether the gas flow is in a range corresponding to said largest cylinder or whether the gas flow should be directed to a smaller cylinder.

20. A method according to claim 17, wherein the respective gas flow ranges of the plurality of cylinders partially overlap.

21. A method according to claim 17, wherein said plurality of cylinders comprises three cylinders having different respective sizes for measuring three respective gas flow ranges.

22. A method according to claim 18, wherein said plurality of cylinders comprises three cylinders having different respective sizes for measuring three respective gas flow ranges.

23. A method according to claim 17, wherein said support portion is a base of said flow meter, and further comprising the step of leveling said base for adjusting the horizontal orientation of the cylinder.

24. A method according to claim 17, further comprising the step of leveling said support portion for adjusting the horizontal orientation of the cylinder.

* * * * *